United States Patent [19]

Nonnenmacher

[11] 4,194,362
[45] Mar. 25, 1980

[54] CONTROL SYSTEM FOR A HYDROSTATIC DRIVE

[75] Inventor: Gerhard Nonnenmacher, Korntal, Fed. Rep. of Germany

[73] Assignee: Robert Bosch GmbH, Stuttgart, Fed. Rep. of Germany

[21] Appl. No.: 918,142

[22] Filed: Jun. 22, 1978

[30] Foreign Application Priority Data

Jun. 30, 1977 [DE] Fed. Rep. of Germany ....... 2729512

[51] Int. Cl.$^2$ ...................... F16D 31/00; F16H 39/46
[52] U.S. Cl. ......................................... 60/431; 60/445; 60/447; 60/494
[58] Field of Search .................. 60/431, 445, 447, 494

[56] References Cited

U.S. PATENT DOCUMENTS

| | | | |
|---|---|---|---|
| 3,986,357 | 10/1976 | Hoffmann | 60/447 X |
| 3,986,358 | 10/1976 | Hoffmann | 60/447 X |
| 4,118,931 | 10/1978 | Nonnenmacher et al. | 60/494 X |

Primary Examiner—Edgar W. Geoghegan
Attorney, Agent, or Firm—Michael J. Striker

[57] ABSTRACT

The control system has an adjustable flow-rate pump and a fixed flow-rate pump which is supplied with hydraulic fluid via a supply conduit. A first throttle is interposed in this conduit and produces first signals in form of pressure differentials in dependence upon variations in the rotational speed of an ungoverned combustion engine which powers the hydraulic drive, which signals trigger flow-rate adjustments of the main pump. A second throttle is also interposed in the supply conduit and produces second signals in form of pressure differentials in dependence upon variations in the load upon the hydraulic motor of the hydraulic drive, which signals trigger movements of the throttle flap of the internal combustion engine towards the open or closed position thereof.

15 Claims, 6 Drawing Figures

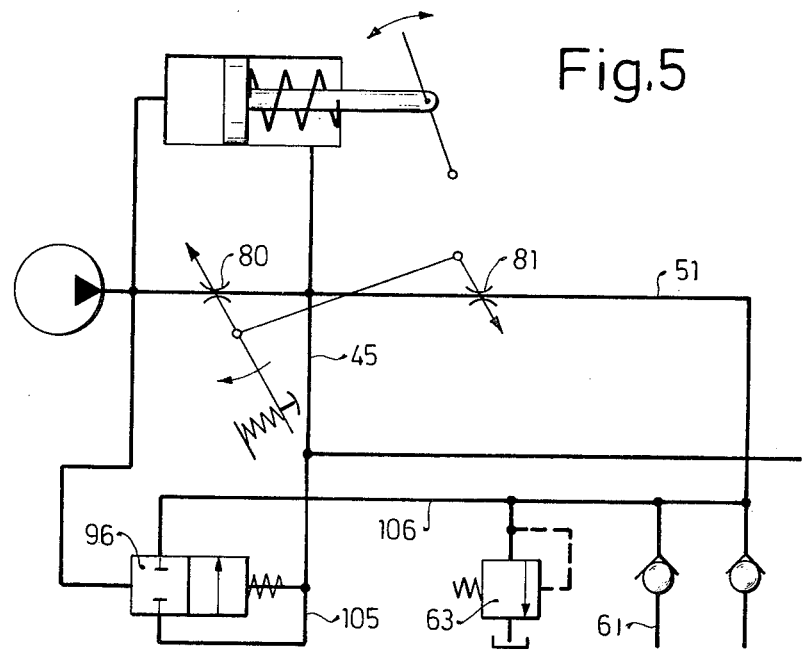
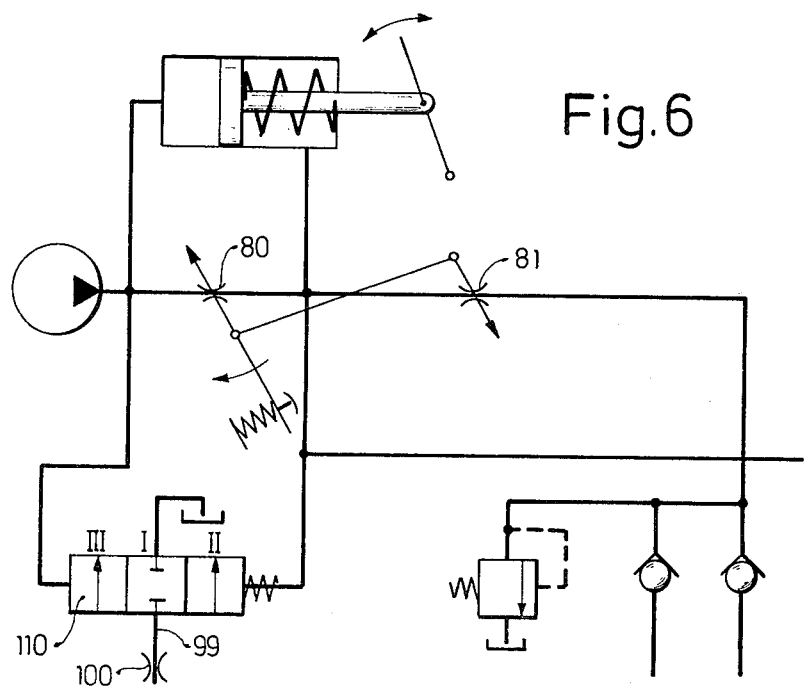

CONTROL SYSTEM FOR A HYDROSTATIC DRIVE

BACKGROUND OF THE INVENTION

The invention herein relates to a control system for hydrostatic drives.

More particularly, the invention relates to a control system for a hydrostatic drive which is powered by a combustion engine.

It is known, e.g. in agricultural vehicles, to utilize a hydrostatic drive which is powered by a combustion engine, and to employ a control system in conjunction with the hydrostatic drive. Combustion engines, for example Otto engines, are usually not regulated as to their number of revolutions per minute (RPM) with the result that operation of the gas pedal controls not the engine RPM but the engine torque. In other words: these are ungoverned engines which are not provided with an RPM governor. Due to this the engine may operate at an RPM level which is so high that the torque applied to the hydrostatic drive exceeds the torque which the drive is capable of handling even at maximum hydraulic pressure.

SUMMARY OF THE INVENTION

It is an object of the invention to overcome these disadvantages.

More particularly, it is an object of the invention to provide an improved control system for combustion-engine powered hydraulic drives which avoids the aforementioned drawbacks.

In keeping with these objects and with still others which will become apparent hereafter, one feature of the invention resides in a control system for a hydrostatic drive which includes a hydraulic motor and is powered by an ungoverned combustion engine having a movable throttle flap, in a combination comprising adjustable-flow rate main hydraulic pump means, fixed-flow rate auxiliary hydraulic pump means operatively connected with the main hydraulic pump means, a fluid supply conduit connected with the auxiliary hydraulic pump means for supplying the main hydraulic pump means with hydraulic fluid, first throttle means in the fluid supply conduit and operative for producing, in dependence upon variations in the rotational speed of the combustion engine, a first signal for initiating adjustments in the flow rate of the main hydraulic pump means, and second throttle means also interposed in the fluid supply conduit and operative for producing in response to variations of the load on the hydraulic motor, a second signal for initiating movements of the engine throttle flap.

One of the advantages of the invention is that the operation of the engine throttle (e.g. of an Otto engine) is controlled by the control system for the hydrostatic drive, thus eliminating the aforementioned problems. Another important advantage is that load can be applied to the combustion engine while the engine operates at low RPM, which means that the engine can power the hydrostatic drive while engine noise and fuel consumption are low. Also, the invention proposes a particularly advantageous embodiment according to which the application of load to the engine by the hydrostatic drive may be limited.

The novel features which are considered as characteristic, of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 diagrammatically illustrates a modification of the embodiment in FIG. 4; and FIG. 6 is a diagrammatic illustration of another modification of the embodiment in FIG. 4.

DESCRIPTION OF PREFERRED EMBODIMENTS

Figure 1:
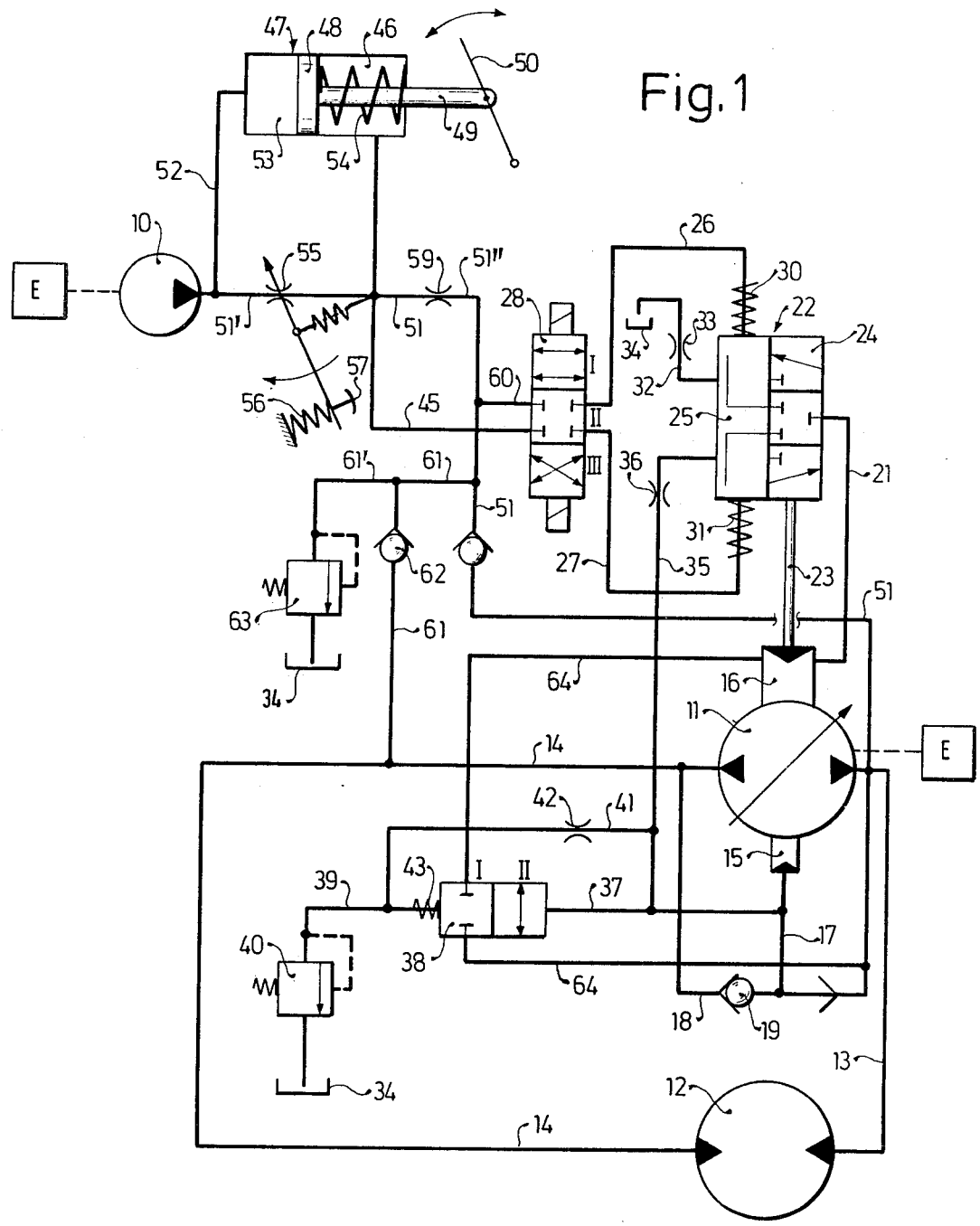
FIG. 1 is a diagrammatic illustration of a first embodiment of the invention.

A first embodiment of the invention is shown in FIG. 1 where a diagrammatically illustrated combustion engine E (e.g. an Otto engine) drives in known manner an auxiliary pump 10 and a variable-flow rate hydraulic pump 11. Pump 11 is connected via conduits 13, 14 in a closed circuit with a hydraulic motor 12 which it supplies with hydraulic pressure fluid. The pump 11 is provided with two adjustors 15, 16 (known per se) by means of which its flow rate can be varied. The adjustors 15, 16 each have piston surfaces which are subjected to fluid pressure; the area of the piston surfaces of the adjustor 15 is smaller than the corresponding area of adjustor 16 and is always subject to the fluid pressure prevailing at the high-pressure side of the drive. For this purpose the adjustor 15 communicates with a conduit 17 which leads to a conduit 18 that in turn communicates with conduit 14. A one-way valve 19 is mounted in the conduit 18 at or near the juncture of the same with conduit 17 and is operated by working pressure in the hydraulic drive.

The adjustor 16 communicates with a conduit 21 via which it is subjected to controlled fluid pressure. For this purpose the conduit 21 communicates with a pressure-proportional device 22 which is composed of a control element 25 and a slide valve 24; the latter is coupled with the adjustor 16 via a rod or analogous linkage 23 so as to share in the movements of the adjustor 16. Conduits 26, 27 are connected to opposite sides of the device 25 and lead to a slidable control valve 28 which serves to select the direction of movement (forward or rearward) of a vehicle powered by the hydrostatic drive.

The opposite ends of the (slidable) device 25 are engaged by springs 30, 31 which act upon it in mutually opposite directions and, in the absence of pressure, maintain it in the illustrated neutral position. A conduit 35, in which a throttle or flow restrictor 36 is interposed, connects the device 25 with a conduit 37 which in turn communicates with the conduit 17. Conduit 37 leads to one end of a slide valve 38 which provides for low-loss pressure limiting of the hydrostatic drive. The other end of valve 38 communicates with a conduit 39 leading to a servo valve 40 which in turn is relieved to the fluid reservoir 34. Another conduit 41 connects the conduit 35 with the conduit 39 and has a throttle or flow restrictor 42 interposed in it. Valve 38 is biased (rightwards in the drawing) counter to the pressure from conduit 37, by a spring 43.

The fluid chamber 46 of a servo controller 47 communicates with valve 28 via a conduit 45; the piston 48 of servo controller 47 operates the throttle flap 50 of the combustion engine E via a linkage 49. A conduit 51 communicates the auxiliary pump 10 with the conduit 45 and also extends beyond the same to the conduit 13 of pump 11. The other fluid chamber 53 of the servo controller 47 communicates with conduit 51 via a conduit 52. A spring 54 in fluid chamber 46 biases the piston 48 towards chamber 53 (leftward in FIG. 1).

An adjustable throttle 55 is interposed in a section 51' of the conduit 51, intermediate the junctures of conduits 52 and 45 with the conduit 51. Throttle 55 is biased by a spring 56 and is operated by depressing a drive pedal 57 counter to the force of this spring 56 so that the effective flow cross-section of the throttle 55 is increased when pedal 57 is depressed. A fixed (non-variable) throttle or flow restrictor is located in conduit 51 downstream of the juncture between conduits 45 and 51.

A branch conduit 60 communicates the valve 28 with the conduit 51, and another branch conduit 61 communicates the conduit 51 with the conduit 14. A one-way valve 62 is interposed in the branch conduit 61 to permit fluid flow from the conduit 61 to the conduit 14, but not in reverse direction. A branch 61' of the conduit 61 communicates with a pressure limiting valve 63 which limits the feed pressure in the hydrostatic drive and is relieved to the reservoir 34. Another conduit 64 communicates conduit 51 with the valve 38.

This arrangement, including the throttles 55 and 59, forms two control circuits. One of these includes the throttle 55 and controls the engine RPM, and the second circuit includes the throttle 59 and controls the flow-rate adjustments of the pump 11. If desired, the throttle 59 may be connected in circuit upstream of the throttle 55.

The auxiliary pump 10 is driven synchronously and proportionally to the engine RPM. This means that as the engine RPM increases the pressure difference across the throttle 55 will rise so that the pressure in conduit 52 increases, whereby the piston 48 is displaced rightwards counter to the combined resistance of the spring 54 and of the fluid in chamber 46, thereby moving the throttle flap 50 towards closed position (i.e. tilting it in clockwise direction). A well-defined engine RPM will be obtained when the throttle flap 50 is closed to just such an extent that the combustion engine is still able to overcome the load torque acting upon it from the hydrostatic drive. The stiffness of spring 54 determines the load-dependent proportionality range, i.e. the cyclical irregularity in the characteristic operating curve of the combustion engine.

In operation of this arrangement, let it be assumed that the valve 28 is in its position I which corresponds to forward movement of the vehicle provided with the arrangement. The (in the drawing) lower end of control element 25 is then subjected via lines 45 and 27 to the pressure ahead of the throttle 59 whereas the (in the drawing) upper endface of the control element is subjected via conduits 26, 60 and 51 to the pressure behind the throttle 59. Let it be further assumed that the pump 11 feeds pressure fluid 13 into the conduit 13 which at this time acts as the high-pressure conduit, the same pressure also being present in the conduits 51, 17, 37, 41, 35 and 39.

If now, the load on the hydraulic motor 12 increases, the pressure will rise in conduit 13 and the torque on pump 11 increases. As a result of this the engine RPM and the revolutions of the auxiliary pump 10 will decrease. This leads to a reduction of the pressure differential across the throttle 55 and a pressure reduction in fluid chamber 53 so that the spring 54 can now shift the piston 48 leftwards, resulting in an opening movement (counter-clockwise pivoting) of the throttle flap 50, whereby the drop in engine RPM is counteracted.

During this adjustment the pressure differential across the throttle 59 has also changed to a slight degree, but sufficient for the spring 30 to shift the control element 25 downwardly so that pressure fluid can now flow from the high-pressure line 35 via the valve 24 and the device 25 into the conduit 21 and from there to the adjustor 16. The adjustor 16 acts to reduce the flow rate of pump 11 slightly, thereby counteracting a torque increase on the pump 11. These measures will thus be seen to maintain fluctuations in the engine RPM within very narrow limits.

Conversely, a reduction of the load acting on the hydraulic motor 12 causes a pressure drop in conduit 13 so that the torque at pump 11 will be reduced. Under these circumstances the engine will tend to increase its RPM, which causes an increase of the pressure differentials across the throttles 55 and 59. As a result the throttle flap 50 is caused to move slightly (pivot clockwise) towards closed position whereas the pump 11 is readjusted for a somewhat increased flow rate, in that the valve 24 and device 25 are moved upwardly (in FIG. 1) so that some of the pressure fluid from the adjustor 16 can flow to the reservoir 34. These measures assure that any increase in the engine RPM are maintained within very narrow limits. Incidentally, it will be understood that the pressure in the adjustor 15 will always be the feed pressure of pump 11.

Since the throttle 55 can be adjusted by operation of the drive pedal 57, it is evident that opening of the throttle 55 by depressing of the pedal 57 enables a user to select increased engine RPM. This, in combination with the pressure relationships at the throttles 55, 59, makes it possible for the engine to have load applied to it even at low engine RPM, so that the operating noise level and the fuel consumption will be reduced.

The auxiliary pump 10 has the additional purpose of supplying fluid to the low-pressure circuit of the hydrostatic drive, via conduit 61 and one-way valve 62 into the conduit 14 which constitutes the low-pressure conduit.

Should the pressure in the high-pressure circuit of the hydrostatic drive exceed a preselected upper value, then the servo valve 40 will open and will cause the valve 38 to move to its position II so that the fluid flow through the drive is relieved without losses, in that fluid can now flow via conduit 64 to the adjustor 16 which resets the pump 11 for a lower flow rate as described above. Thus, a low-loss or no-loss pressure limiting arrangement is provided.

Figure 2:
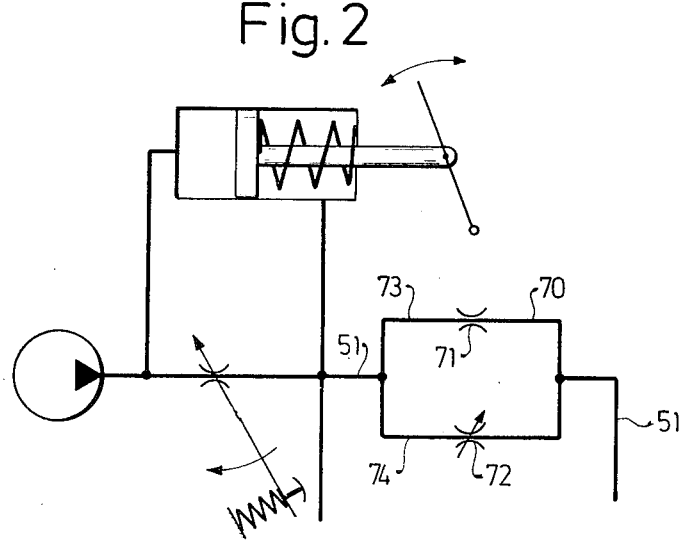
FIG. 2 is a diagrammatic view showing a modification of the embodiment in FIG. 1.

The embodiment of FIG. 2 is largely identical to that of FIG. 1 and therefore only those components which are different have been illustrated.

In FIG. 2, the FIG. 1 throttle 59 for the control circuit of pump 11 is replaced with a specially configurated throttle unit 70 in which a constant cross-section throttle 71 and an adjustable cross-section 72 are connected in parallel. To make this possible the conduit 51 has branches 73, 74 which are re-united behind the throttle unit 70. The cross-sections of the throttles 71, 72 are so chosen that the flow cross-section of the constant throttle 71 is smaller than the maximum flow cross-section of the adjustable throttle 72. This modification of FIG. 2 permits a more precise coordination of the adjustments of pump 11 relative to the output characteristics of the combustion engine which is being employed to power the drive.

Figure 3:
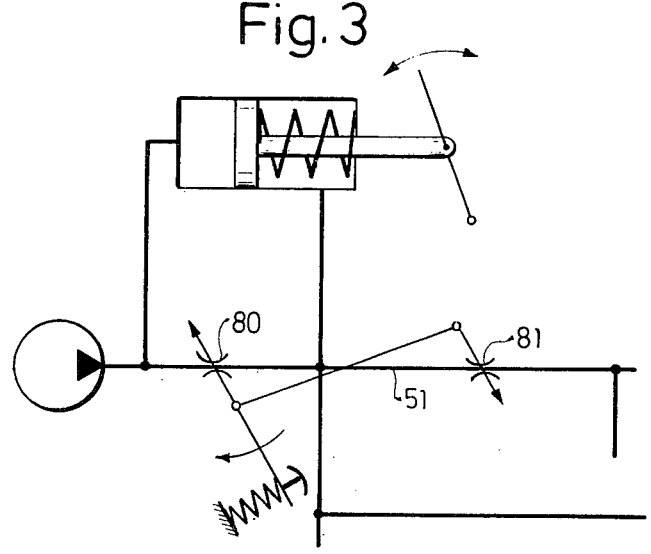
FIG. 3 is a diagrammatic view showing another modification of the embodiment in FIG. 1.

The embodiment of FIG. 3 is also identical to that of FIG. 1, except for the fact that the throttles 55 and 59 in conduit 51 have been replaced with two throttles 80, 81 which are both adjustable. Moreover, the throttles 80 and 81 are coupled with one another so that adjustment of one of them (i.e. of its flow cross-section) results in concomitant adjustment of the other throttle. Depending upon the pressure curve desired for the pump 11, the throttles 80 and 81 may be so coupled with one another that the flow cross-section of throttle 81 is decreased when that of the throttle 80 is increased, or vice versa, or that an increase or decrease in the flow cross-section of one of the throttles results in an automatic concomitant increase or decrease of the other throttle.

Figure 4:
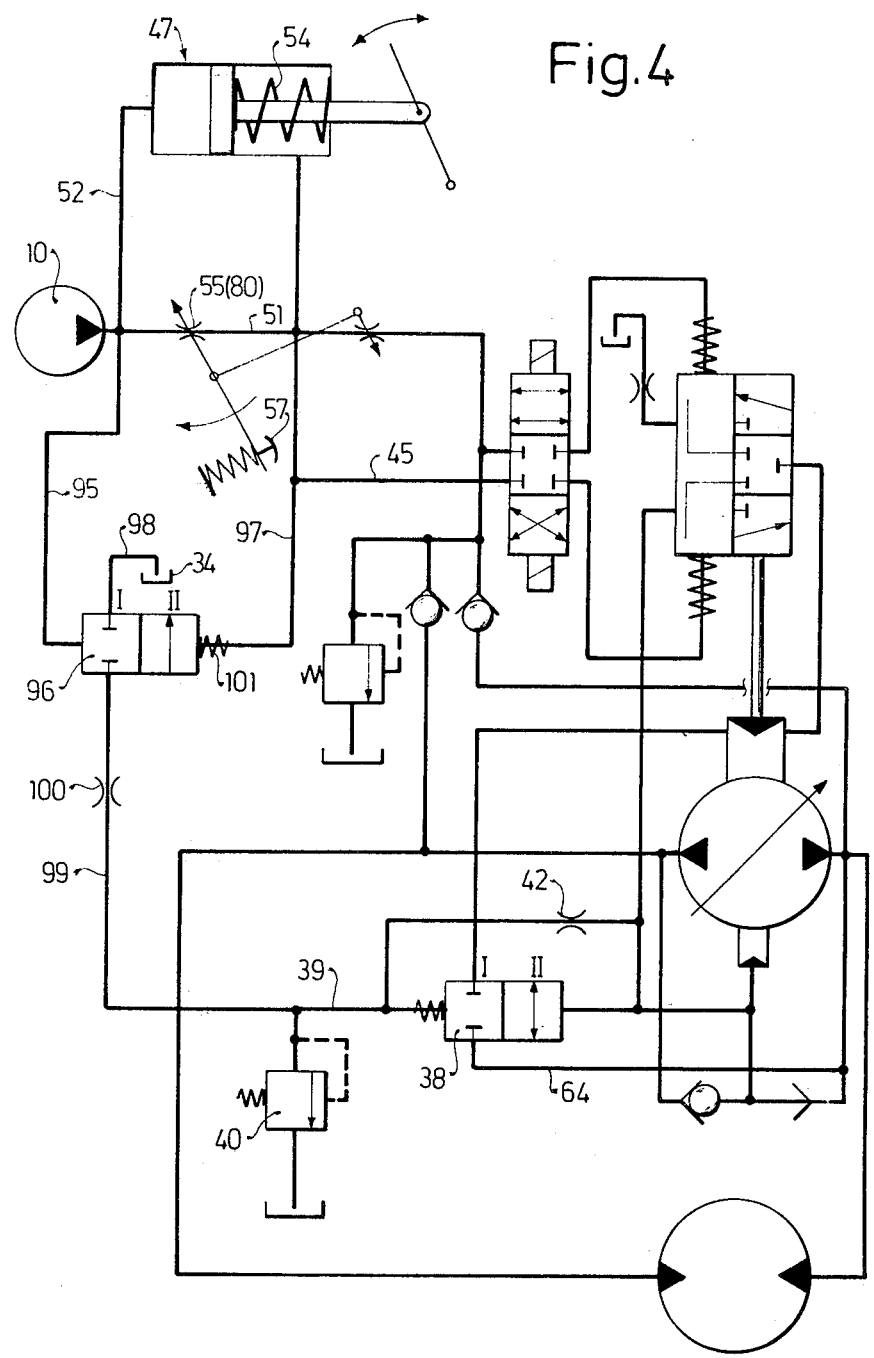
FIG. 4 is a view similar to FIG. 1 but of a further embodiment.

A further embodiment is illustrated in FIG. 4 and two modifications thereof are shown in FIGS. 5 and 6. In these three Figures the basic difference from the embodiment of FIG. 1 is the addition of load limit control which prevents stalling of the combustion engine under load. Like reference numerals designate in FIGS. 4–7 the same components as in FIG. 1.

In FIG. 4 a branch conduit 95 extends from the conduit 51 to one endface of a slide valve 96. The other endface of the valve 96 is communicated with the conduit 45 by a conduit 97. Valve 96 is a two-way two-position valve and is connected with the reservoir 34 via a conduit 98 and with the conduit 39 via a conduit 99. A throttle 100 is interposed in the conduit 99. In all other respects the embodiment of FIG. 4 is identical with the one of FIG. 1 (of course, the modifications of FIGS. 2 and 3 could also be utilized in it).

In operation of the FIG. 4 embodiment the pressure differential across throttle 55 (or 80) will remain within the limits given by the spring 54, as long as the engine RPM corresponds to the value selected by operation of the drive pedal 57. If, however, the load is so high that the engine cannot respond to the selection made by operation of the pedal 57, then the pressure differential across throttle 55 (or 80) drops below the value given by the pressure of the spring 54 and the load limit control feature of the FIG. 4 embodiment becomes effective.

This means that under these circumstances a spring 101 acting upon the slide valve 96 shifts the valve 96 from its illustrated position I to the position II, so as to permit the flow of pressure fluid from the conduit 99 via the throttle 100 and the valve 96 to the reservoir 34. This results in the development of a pressure drop across the throttle 42 which is sufficient to cause valve 38 to move to its own position II, whereby the pump 11 is readjusted for a reduced flow rate as described with reference to FIG. 1. The flow rate through pump 11 is decreased until the combustion engine E has again reached its preselected RPM value. The valve 96 closes just far enough to cause the valve 38 in turn to almost block the fluid flow; cooperation of the valve 38 with one of the throttles 55, 59 (or 80, 81) then causes the setting of the pump 11 to become stabilized in an intermediate position.

The embodiment of FIG. 5 is identical with the one in FIG. 4, except that here the conduit 99 is replaced with a conduit 105 which connects the valve 96 with the conduit 45. In addition, a conduit 106 connects the valve 96 with the conduit 51. The feed-pressure limiting valve 63 and the conduit 61 which supplies pressure fluid to the low-pressure circuit of the arrangement, are both connected with the conduit 106. In this manner the throttle 81 of the second circuit (which controls the adjustment of pump 11) are bridged by the load limit control and the pump 11 is thus adjusted towards a reduced flow rate.

Finally, the embodiment of FIG. 6 is also identical with the one in FIG. 4 except that it is provided with a slide valve 110 which is capable of assuming three operating positions I, II and III. When the vehicle is braked and engine RPM tends to increase, the fluid pressure at throttle 80 of the first control circuit (which controls engine RPM) rises to a value which is not reached during normal operation; this causes valve 110 to move to position III so that the RPM increase is blocked. If a braking torque develops which cannot be absorbed by the engine, the pump 11 is readjusted for a higher flow rate, thereby limiting the effective braking torque to a value which the engine is capable of absorbing.

While the invention has been illustrated and described as embodied in a control circuit for a hydrostatic drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In a control system for a hydrostatic drive which includes a hydraulic motor and is powered by an ungoverned combustion engine having a movable throttle flap, a combination comprising adjustable-flow rate main hydraulic pump means; fixed-flow rate auxiliary hydraulic pump means operatively connected with said main hydraulic pump means; a fluid supply conduit connected with said auxiliary hydraulic pump means for supplying the main hydraulic pump means with hydraulic fluid; first throttle means in said fluid supply conduit and operative for producing, in dependence upon variations in the rotational speed of the combustion engine, a first signal for initiating adjustments in the flow rate of said main hydraulic pump means; and second throttle means also interposed in said fluid supply conduit and operative for producing in response to variations of the load on the hydraulic motor, a second signal for initiating movements of the engine throttle flap.

2. A combination as defined in claim 1, wherein said second throttle means comprises a throttle having an adjustable flow cross-section, said first throttle means comprising a throttle having a fixed flow cross-section.

3. A combination as defined in claim 1, wherein said first and second throttle means each comprise a throttle having an adjustable flow cross-section.

4. A combination as defined in claim 3, wherein both of said throttles are coupled for simultaneous and identical adjustment of their flow cross-sections.

5. A combination as defined in claim 3, wherein both of said throttles are coupled for simultaneous but inverse adjustment of their respective flow cross-sections.

6. A combination as defined in claim 1, wherein said second throttle means is interposed in said fluid supply conduit ahead of said first throttle means.

7. A combination as defined in claim 1, wherein said second throttle means is interposed in said fluid supply conduit past said first throttle means.

8. A combination as defined in claim 1, wherein said first throttle means comprises one throttle having a fixed flow cross-section and another throttle connected in parallel with said one throttle and having an adjustable flow cross-section.

9. A combination as defined in claim 1, wherein said second throttle means comprises a throttle having an adjustable flow cross-section, and means for adjusting said flow cross-section at the option of an operator.

10. A combination as defined in claim 1, further comprising a fluid-operated cylinder and piston unit connected with said second throttle means and with the throttle flap for effecting movement of the latter in response to the second signals produced by said second throttle means.

11. A combination as defined in claim 1, wherein said main hydraulic pump means comprises hydraulic pressure-proportional flow-rate adjusting means operatively connected with said first throttle means for effecting flow-rate adjustments of said main hydraulic pump means in response to said first signals produced by said first throttle means.

12. A combination as defined in claim 1, and further comprising a fluid circuit including control valve means interposed in said fluid circuit and connected with said second throttle means for adjusting said main hydraulic pump means for a reduced flow rate in response to a respective second signal produced by said second throttle means.

13. A combination as defined in claim 12, said control valve means being movable to and from a neutral no-load position, and said main hydraulic pump means including hydraulically operated flow-rate adjusting means; and wherein said fluid circuit includes additional valve means movable to and from an open position and cooperating with said control valve means to be moved to said open position in response to movement of said control valve means to said neutral position.

14. A combination as defined in claim 13, wherein said control valve means comprises a two-way two-position valve, and a biasing spring acting upon said valve counter to said second signal which is constituted by a hydraulic pressure difference across said second valve means.

15. A combination as defined in claim 13, wherein said control valve means comprises a two-way three-position valve, and a biasing spring acting upon said valve counter to said second signal which is constituted by a hydraulic pressure difference across said second valve means.

* * * * *